United States Patent

[11] 3,601,159

| [72] | Inventors | Murray Marks<br>Los Angeles;<br>Harry A. King, Covina; Paul A. Longwell,<br>San Gabriel, all of, Calif. |
|---|---|---|
| [21] | Appl. No. | 703,776 |
| [22] | Filed | Feb. 7, 1968 |
| [45] | Patented | Aug. 24, 1971 |
| [73] | Assignee | The United States of America as represented by the Secretary of the Interior |

[54] TUBULAR MEMBRANE AND MEMBRANE SUPPORT MANUFACTURING PROCESS
3 Claims, 12 Drawing Figs.

[52] U.S. Cl. ............................................. 138/141,
138/145, 138/177, 156/141, 156/145, 156/177
[51] Int. Cl. ........................................................ F16l 9/14
[50] Field of Search .......................................... 156/171,
173, 294; 138/146, 145, 141, 177

[56] References Cited
UNITED STATES PATENTS

| 1,949,476 | 3/1934 | Kennedy | 156/294 |
| 2,759,864 | 8/1956 | Kuebler | 156/294 |
| 2,767,431 | 10/1956 | De Laubarede | 156/294 |
| 2,859,151 | 11/1958 | Usab et al. | 156/294 |
| 3,068,133 | 12/1962 | Cilker et al. | 156/171 |
| 3,068,134 | 12/1962 | Cilker et al. | 156/294 |
| 3,376,180 | 4/1968 | Larson et al. | 156/294 |
| 3,391,039 | 7/1968 | Bascom et al. | 156/171 |
| 3,340,115 | 9/1967 | Rubenstein | 156/294 |

Primary Examiner—Carl D. Quarforth
Assistant Examiner—Brooks H. Hunt
Attorneys—Ernest S. Cohen and Albert A. Kashinski ABSTRACT: Reverse osmosis tubes, and a method for forming them including the steps of: wrapping a porous paper strip about a mandrel; sealing the porous paper strip at its edges to form a porous paper tube; moving the porous paper tube along the mandrel; winding resin-impregnated glass fibers over the outer surface of the moving tube to produce a porous glass fiber coating; heating the glass fiber coating to cure the resin as it moves with the tube; cooling the glass fiber coating; coating the inner surface of the moving porous paper tube with a thin layer of reverse-osmosis-membrane-forming solution; drawing a slight vacuum around the outer surface of the porous glass fiber coating in an area overlapping the axial position where the membrane-forming solution is applied, causing the membrane-forming solution to closely adhere to the inner surface of the porous paper tube; and, immersing the coated porous paper tube in a gelation bath to gel the film to a useable membrane state.

PATENTED AUG 24 1971
3,601,159
SHEET 1 OF 4
FIG.-1
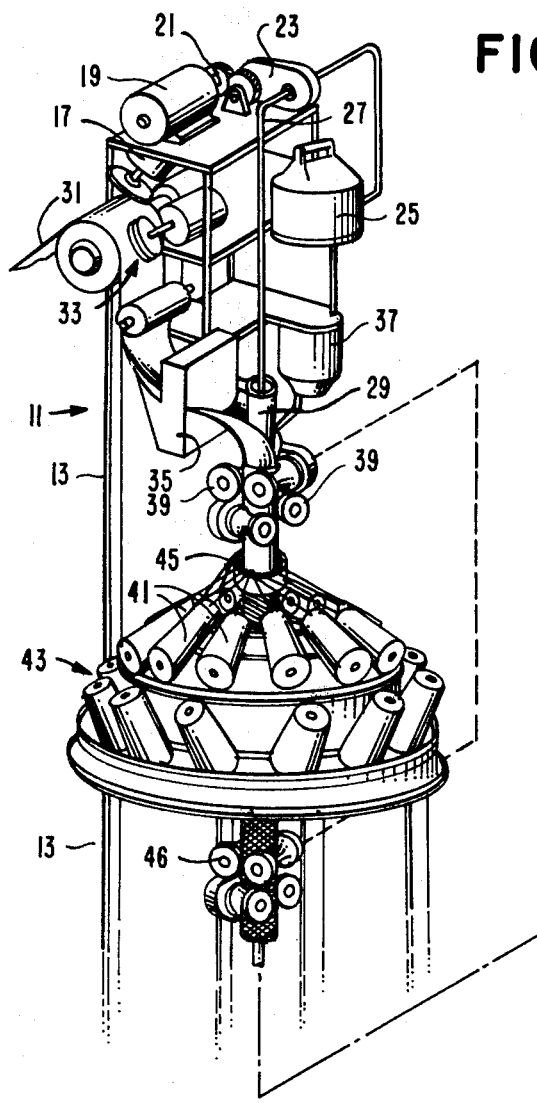
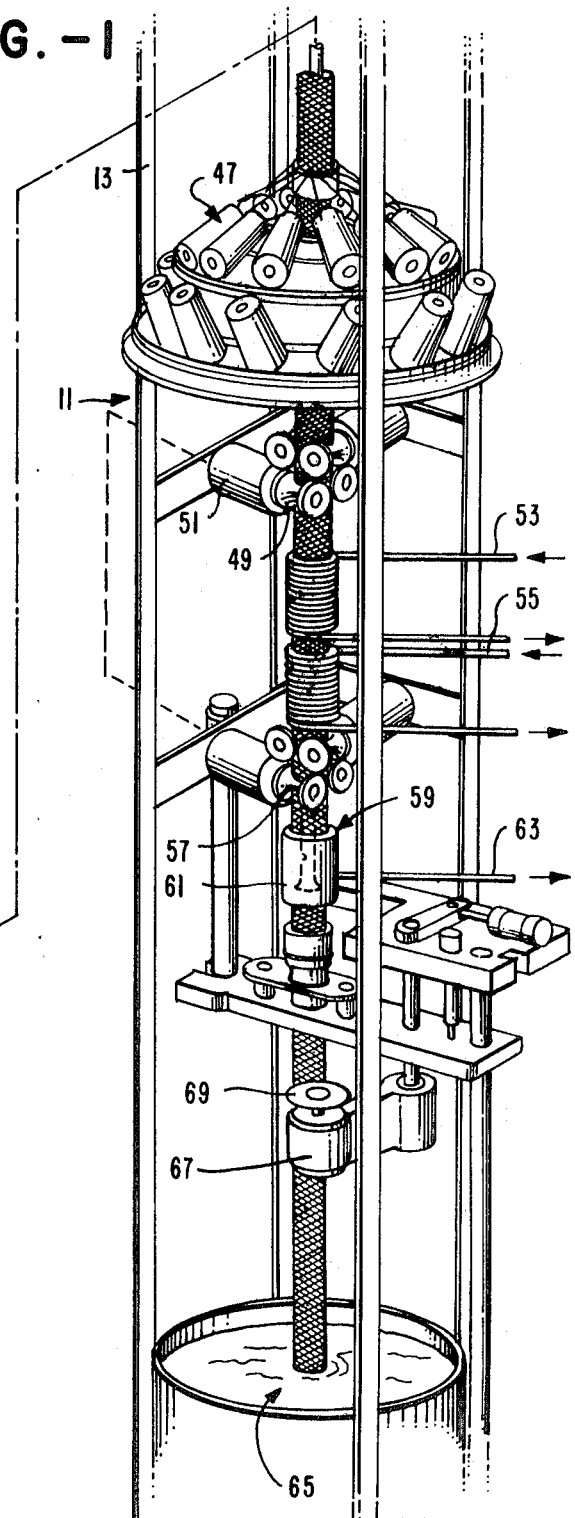
INVENTORS
MURRAY MARKS
HARRY A. KING
PAUL A. LONGWELL
BY Edward O. Ansell
J. R. Anderson
ATTORNEYS FIG.—7
FIG.—2
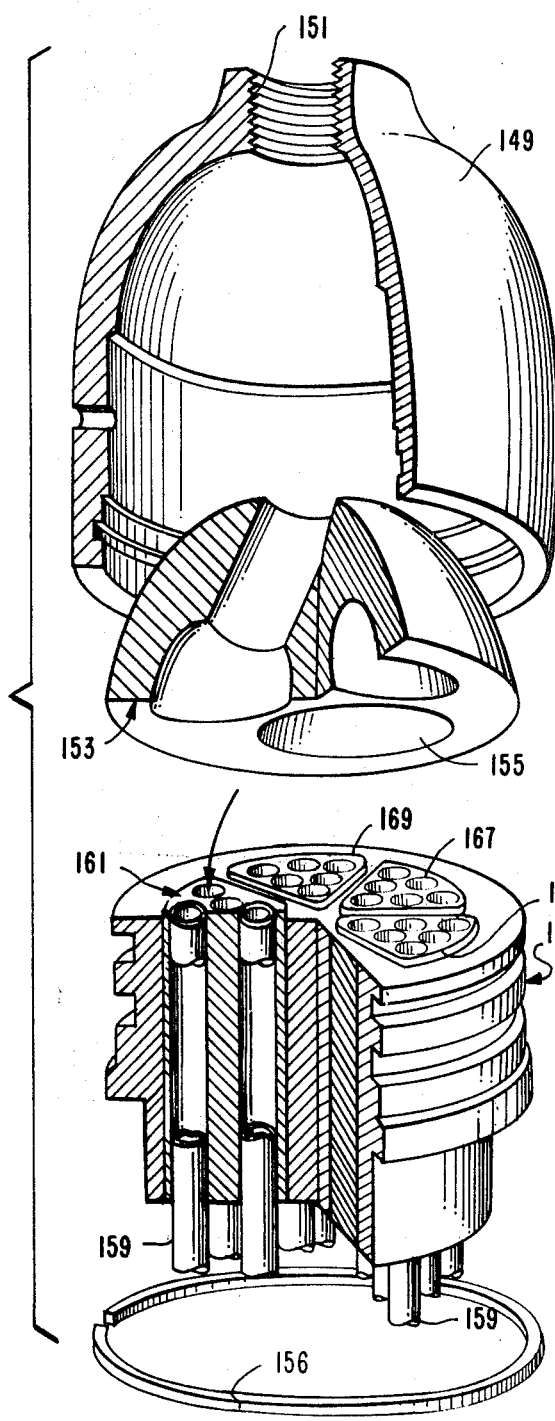
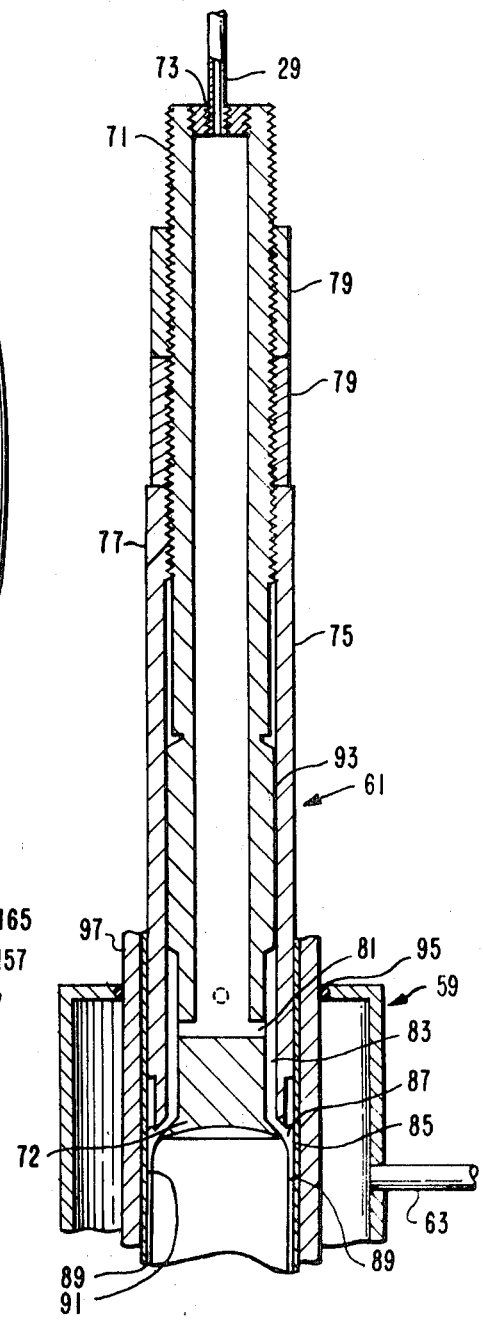
INVENTORS
MURRAY MARKS
HARRY A. KING
PAUL A. LONGWELL
BY
Edward O. Ansell
J. R. Anderson
ATTORNEYS

INVENTORS
MURRAY MARKS
HARRY A. KING
PAUL A. LONGWELL

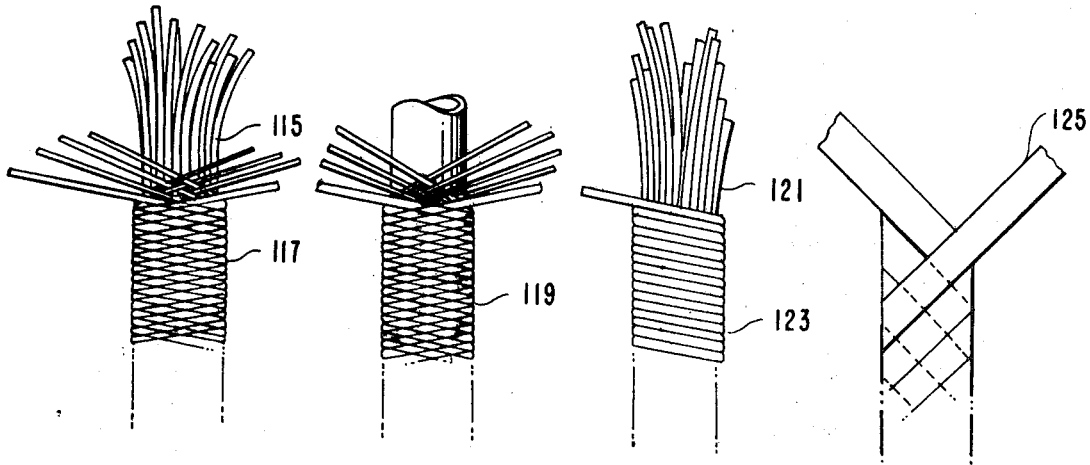
FIG.-4A  FIG.-4B  FIG.-4C  FIG.-4E
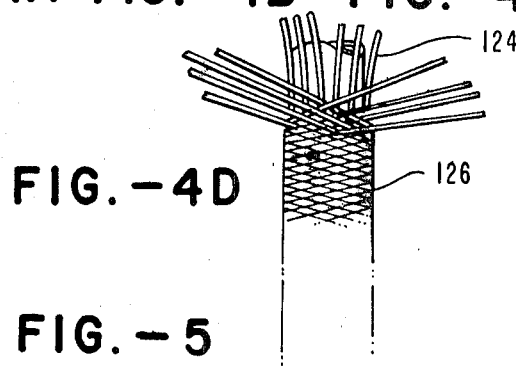
FIG.-4D
FIG.-5   FIG.-5A
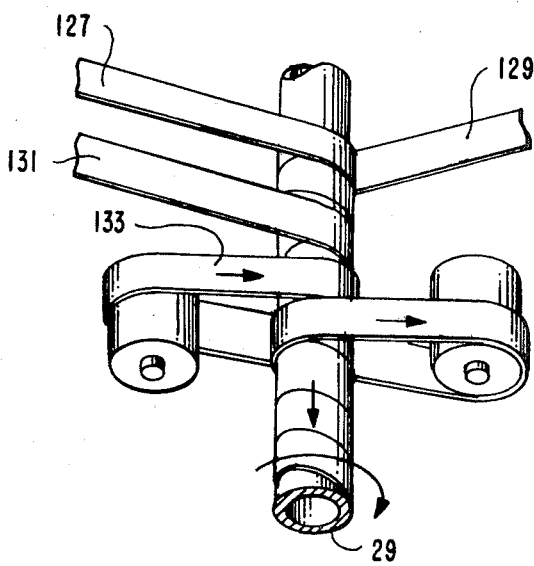
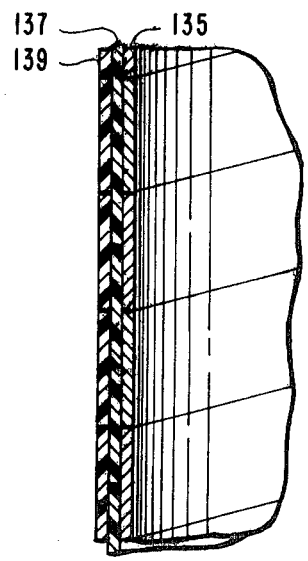

TUBULAR MEMBRANE AND MEMBRANE SUPPORT MANUFACTURING PROCESS

There is disclosed in U.S. Pat. No. 3,291,730 of Dec. 13, 1966, a novel process for removing detergents from water. This process comprises passing the water through a cellulose acetate membrane mounted in a pressure cell. The membrane under pressure selectively passes only the purified water. The cellulose acetate membranes have additionally been found to be valuable in techniques for desalting brackish water or sea water. Prior to the herein invention, most of the cellulose acetate reverse osmosis elements were cast as flat films for use in what has now become standard reverse osmosis pressure equipment wherein the brackish water was forced under pressure over the flat-formed membranes.

Prior to the herein invention, thought has been given to forming the reverse osmosis membrane into the form of tubular elements for use in pressure equipment closely resembling heat exchangers, wherein the brackish water would be forced under pressure in a continuous manner through the tubular elements and the purified water collected within the confines of a tank or like collection structure. The tubular elements provide for high surface area of membrane in a small volume of space. However, the use of the tubular elements have not found widespread acceptance, mainly due to two factors: Firstly, the elements have not been produced in a continuous manner. Since a large number of the tubular elements are used per device, the time and cost of forming these elements by a batch process makes them high in cost. Additionally, the method by which the tubular-formed elements have been batch formed does not produce as even a coating of a film of membrane as desired. It is quite important that the membrane be applied in a layer of even thickness within the whole tube. The prior technique for forming the tubular reverse osmosis elements is known as a drop-forming process, wherein the basic tube structures are initially formed at given lengths. The formed structural tubular elements are positioned vertically, the membrane solution is poured into them, then the elements are pulled downward over a steel ball suspended by a wire passing through the tube, the steel ball having an outer diameter slightly smaller than the inner diameter of the formed tube such that the difference between the two diameters will produce the thickness of membrane desired. Any irregularities, however, in the formed wall of the structure passing over the tube will produce accordingly variations in the thickness of the membrane, as can well be appreciated.

A second approach has been to deposit the membrane solution onto a glass tube, gel it in water, then remove it from the glass tube and insert the resultant tubular membrane into a structural metallic or plastic tube for use. This technique also clearly has its limitations.

Thus, it is an object of this invention to provide an improved method for forming tubular reverse osmosis elements.

Another object of this invention is to provide a novel method for the continuous formation of tubular reverse osmosis elements.

Still another object of this invention is to provide a new method for the continuous manufacture of reverse osmosis elements, which method reduces the cost of producing such elements.

The above and other objects of this invention are accomplished by a process of continuously forming the support structure together with the membrane over a mandrel. The membrane must be applied to a relatively flat, even, and not too porous surface. BEcause of this, it is generally preferred to first form paper about the mandrel. The paper is directed to the mandrel having a diameter equal to the desired internal diameter of the tube. The edges of the paper are suitably scarfed and glue applied, which will rapidly set, gluing the seam of the paper together forming a flat-seamed tube about the mandrel. After this, additional pressure is applied against the formed paper, causing it to adhere and form about the mandrel. Downstream from the paper is located means for applying reinforcement fibers about the paper. This can be accomplished in various winding patterns, the purpose being to provide the necessary strength to the tubular element. The fibers which, for example, can be resin-impregnated Fiberglass, are appropriately wound about the paper to provide a porous structure having a permeability greater than that of the paper. Downstream from the means for applying the fibers are located rollers which advance the formed paper and fiber tube along the mandrel. After the rollers move the element along the mandrel, a heating means cures or melts the resin in the fibers. A cooling means is generally required and is located adjacent to the heating means, to cool the tube back down to a temperature suitable for applying the membrane solution. Inside the entire length of the mandrel is a hollow tube terminating just below the bottom end of the mandrel with an extrusion head which is provided with an opening about its entire periphery in the form of a nozzle. Surrounding the formed pipe, about its outer circumference adjacent to the location of the inner nozzle, is an enclosed chamber in which slightly vacuum conditions are maintained. This serves to pull the membrane solution directed from the nozzle into tight adherence with the paper inner wall. The membrane solution, which is highly viscous for this particular application, is pumped through the center of the forming mandrel to the nozzle. The thickness of the resultant film is controlled generally by the rate of provision of membrane solution, the opening in the nozzle, and the rate at which the formed tube moves past the nozzle area, thus pulling the viscous material away from the nozzle area into a thin film. The higher the rate of tube movement, obviously, the thinner the film that is formed for a given nozzle opening and solution feed rate. Just prior to the membrane application, the mandrel terminates. Following membrane application, the tube is directed into a water bath which gels the membrane solution. Just before or after the bath, the tube may be cut to desired lengths or can be wound or formed into spiral configurations where such is desired. The resulting process provides a membrane of extremely even and continuous thickness throughout the tubes formed. Regardless of imperfections in the wall of the structure to which the membrane solution is applied, its thickness hardly varies. The membrane will rather follow the imperfection. This is due, as indicated, to the fact that the governing factors relating to the thickness of the membrane are the rate at which the tube moves past the nozzle, the nozzle opening, and the rate of supply of membrane solution, and will be explained in more detail.

Alternatively to the herein invention, the membrane can be applied on an outer surface of the tube. In this instance the process is reversed, where the filaments become the inner layer with the paper formed thereabout, and finally the membrane applied on the outer surface through a concentric nozzle. In this particular instance, the brackish water is directed on the outside of the tubes under pressure, with the tubes themselves carrying to a suitable container the clean water that is passed through the membranes. Further, as indicated, the paper serves to provide a smooth surface to which the membrane solution can be readily applied. Thus, it should be apparent that paper is not necessary in all applications. For example, adjacent longitudinal fibers can be applied to the mandrel to form a smooth surface for the membrane. These longitudinal fibers will then be overwrapped with resin-impregnated fibers in the same manner as the paper tube.

It is believed that the invention will be better understood from the following detailed description and drawings in which:

FIG. 1 is a pictorial representation of the apparatus utilized to perform the method of this invention;

FIG. 2 is a cross-sectional view of the nozzle used to apply the membrane forming solution;

Figure 6:
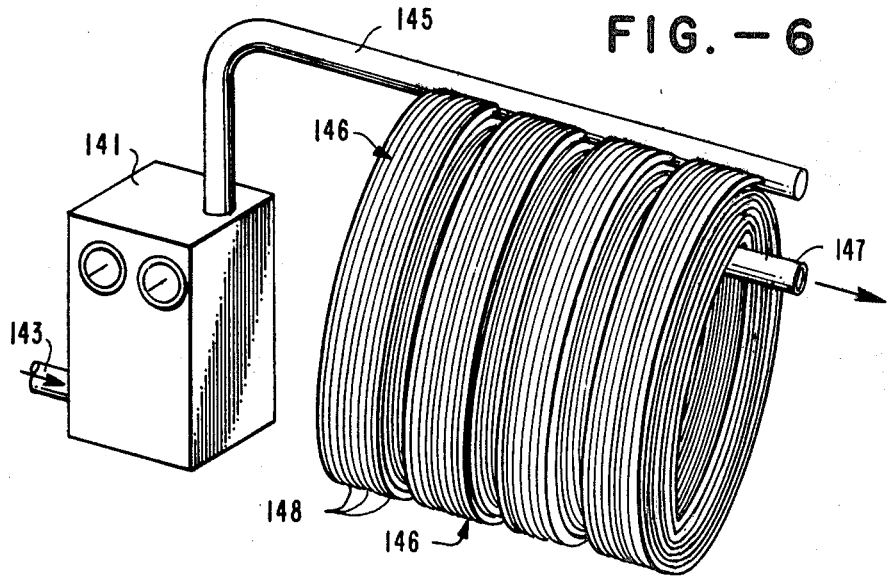

FIGS. 4A–E are pictorial views depicting different winding patterns for applying the reinforcing elements used to form the tube;

FIG. 5 is a pictorial representation of a further embodiment of applying the paper and reinforcing fibers to form the tube;

FIG. 5A is a cross-sectional view of a formed tubular element made in accord with the winding pattern of FIG. 5;

FIG. 6 is a pictorial view of an embodiment utilizing spiral-wound tubular elements to clean brackish water or the like; and FIG. 7 is a partially sectional pictorial view of a manifold end of one embodiment for utilizing straight tubular elements to clean brackish water and the like.

Turning now to FIG. 1, there is shown the entire device utilized to form the tubular membrane structures in accord with the method of this invention. The device comprises a support structure 11 having vertical bars 13 extending upwardly from feet (not shown) suitably attached to a flooring. On a top platform 17 of the structure is mounted a motor 19, gearbox 21 and associated pump 23. The pump is supplied by a reservoir 25 which contains a reverse-osmosis-membrane-forming solution. A thin hollow tube 27 is directed from the pump 23 down through the center of a mandrel 29 about which the tubular element is to be formed. The tube 27 serves to carry the membrane solution through the mandrel to a nozzle utilized to inject the membrane solution onto the formed tube, as will be further explained. A supply of paper 31 is directed through a scarfing apparatus 33 and forming jaw 35 onto mandrel 29 thereby surrounding it. Glue from a supply 37 is applied to an edge of the scarfed paper prior to it being formed about the mandrel 29 by guide rollers 39. The scarfer device 33 provides the necessary beveled edges on the paper so as to assure a relatively smooth seamed construction of the formed paper while providing a large surface area to be glued at the seam. The device will be described in more detail with regard to the description of FIG. 3.

Guide rollers 39 are shown as idler rollers which maintain a slight pressure upon the paper placed about the mandrel 29 so as to force it is conform therewith into the desired tubular shape. The rollers 39 may, however, be driven if so desired. The glue is, for example, one of several hot melts which will readily set up in a short period of time, essentially on contact with the second paper edge. After the paper 31 has been formed about the mandrel into the tubular shape by guide rollers 39, fiber in the form of resin preimpregnated glass fibers 41 are wound in the desired pattern by a braiding apparatus 43 about the paper tube. The braider is a conventional device such as, for example, a Wardwellian- or Butts-type braider. The only modifications to the conventional braider are the use of a ring 45 over which the individual strands are directed prior to surrounding the tube passing therethrough, and the addition of stationary spools to provide longitudinal fibers. The ring 45 serves to direct the fibers onto the tube in a downward direction as the tube is moving through the device. After a first braider was wound the fibers 41 in a desired pattern, idler guide rollers 46 serve to form the wound fibers against the paper tube prior to an additional layer of fibers being applied by a second braider apparatus 47. It should be pointed out that it is not necessary in every application to utilize two layers of fibers. However, in the particular embodiment shown and in many instances it is often preferable to wind the fiber-reinforcing elements in two-layer configuration to reduce the roughness of the braided surface.

After the second braider, the paper with fibers wrapped thereabout is directed to driven rollers 49 which are controlled by control motors 51 which are rigidly controlled by the same power source as the braider. The rollers 49 are in tight contact with the formed element and serve to determine the speed by which the tube moves through the entire device over the mandrel 29 and past the nozzle which applies the membrane-forming solution. Thus, the rollers 49 serve as the controlling factor for the speed of operation of the device. Following the driven rollers 49 the structure is surrounded by heating coil 53 which can be a resistively heated coil that conductively heats the formed tube, melting or curing the resin material. A typical heating temperature for phenoxy thermoplastic resin is 350–400° F. Any other suitable means can be utilized for raising the temperature and effecting melting of the resin in both the paper and the impregnated fibers. An example of such other method would be the use of ultrasonic energy or radiation at this region of the device. Immediately following the heater coils 53 are cooling coils 55, which serve to reduce the temperature of the bonded tube back to at least ambient conditions suitable for application of the membrane-forming solution. Cryogenics or ice water can pass through these coils to effect the desired cooling or cool air can be applied directly.

Following the cooling coils is a second set of drive wheels 57, which further serves to control the rate of movement of the tube and which are also hooked to a master drive. Downstream and adjacent to the second set of drive wheels 57 is disposed the nozzle area 61 of the device. This area is surrounded by a vacuum chamber 59 through which a slight vacuum is maintained through line 63. A vacuum may also be applied internally above the nozzle by plugging the entire forming mandrel and applying a vacuum to it. The details of the nozzle are shown in FIG. 2 and will be later described with regard to that figure. After the membrane has been applied in the region of the nozzle 61, the tube is then directed into a water bath 65 where the membrane is gelled. Prior to entering the bath, the tube is conducted past a device 67 provided with a rotary blade 69 for controllably cutting the formed tubes to desired length.

Turning now to FIG. 2, there is seen the details of the nozzle portion 61 of the device for applying the membrane to the formed tube. An inner tube 71 of machined stainless steel or the like is threadedly secured at 73 to the end of the line 29 which carries the membrane solution through the center of the mandrel. The mandrel in the device terminates just after the rollers 57, prior to the nozzle portion. A second tube 75 is disposed concentrically about the inner tube 71. Outer tube 75 is secured at its uppermost end 77 by being threadedly affixed to tube 71. Two locknuts 79 secure tube 75 in place relative to the inner tube 71. The bottom end 72 of the inner tube 71 is a solid plug. Just above the plug 72 are apertures 81 which conduct the membrane solution from the tube 71 into an area 83 defined as a concentric chamber between the inner tube 71 and the outer tube 75 and is formed by machining away a portion of the outer circumference of the inner tube 71 in that region. The plug 72 is flared outwardly at 85 to form a nozzle together with the canted portion 87 at the bottom of the outer tube 75. This provides a completely concentric nozzle area directing the membrane-forming solution to flow in a slight bubble 87 about the entire inner periphery of the formed paper tube 91. It is quite important obviously that the plug portion 72 be accurately centered relative to the outer tube 75 so as to provide for an even flow of the membrane-forming solution about the circumference. This is accomplished by providing a tight-fitting portion 93 which is comprised of a closely machined outer wall of the inner tube 71 fitted against carefully machined inner wall of the outer tube 75 along this area.

As indicated and shown, membrane-forming solution 89 will tend to flow out in a slight bubble onto the paper tube 91. The vacuum box 59 has rubber seals 95 to ensure close fit with the outer Fiberglass structure 97 so that a slight vacuum can be drawn through line 63. A vacuum, for example on the order of about 5 inches of water pressure, is sufficient to draw the membrane-forming solution 89 tightly against the walls of the paper tube 91 in an even layer. As can be appreciated, the vacuum drawn cannot be very severe or it will pull the membrane-forming solution through the paper and Fiberglass windings which are porous as previously indicated. Thus, the vacuum is merely sufficient to cause adherence of the solution to he wall of the paper tube 91 providing a film or membrane thereon. Further, it should be apparent that the thickness of the membrane formed will be related to the amount of solution applied by the nozzle. Thus, the thickness is controllable by the selective size of the nozzle opening and the rate of supply of solution, as well as the speed of the tube.

In order to achieve the formation of the film of membrane as shown in FIG. 2, the solution passing through the nozzle area must be quite viscous. The most useful solutions have a viscosity range of 25,000 to 150,000 centipoises. The final membrane must possess suitable osmotic properties, such as for example, a flux of 10 gallons per square foot per day (g.f.d.) at less than 1,000 p.p.m. from 3.5 percent sodium chloride at 1,500 p.s.i. Additionally, since the air space in the tube is limited, evaporation cannot be utilized as a means to rid the membrane solution of any solvent utilized. Thus, it is important that the membrane solution have a composition in which loss of solvent prior to gelation is not necessary, Additionally, since this is a continuous process, the solution should be capable of being gelled in virtually a fraction of a second after casting. Typical compositions would comprise 10 grams of cellulose acetate, such as type E 398-3, a cellulose acetate powder of Eastman Chemical Products, Inc., containing an acetyl content of approximately 39.8 percent and a viscosity of 6.8 to 14.8 poises, 18 to 25 grams of acetone as a solvent, 4 to 7 grams of propionamide as a swelling agent, and 1 to 4 grams of water. A preferred solution comprises 10 grams of cellulose acetate type E 400-23 having an acetyl content of approximately 39.9 percent and a viscosity of 64 to 132 poises, 20 grams of acetone, 6 grams of propionamide and 3 grams of water. This produces a casting solution having a viscosity of about 80,000 centipoises. Many other forms of cellulose acetate are suitable, including E 398-6, 398-10, etc., as well as mixtures of these formulations.

Figure 3:
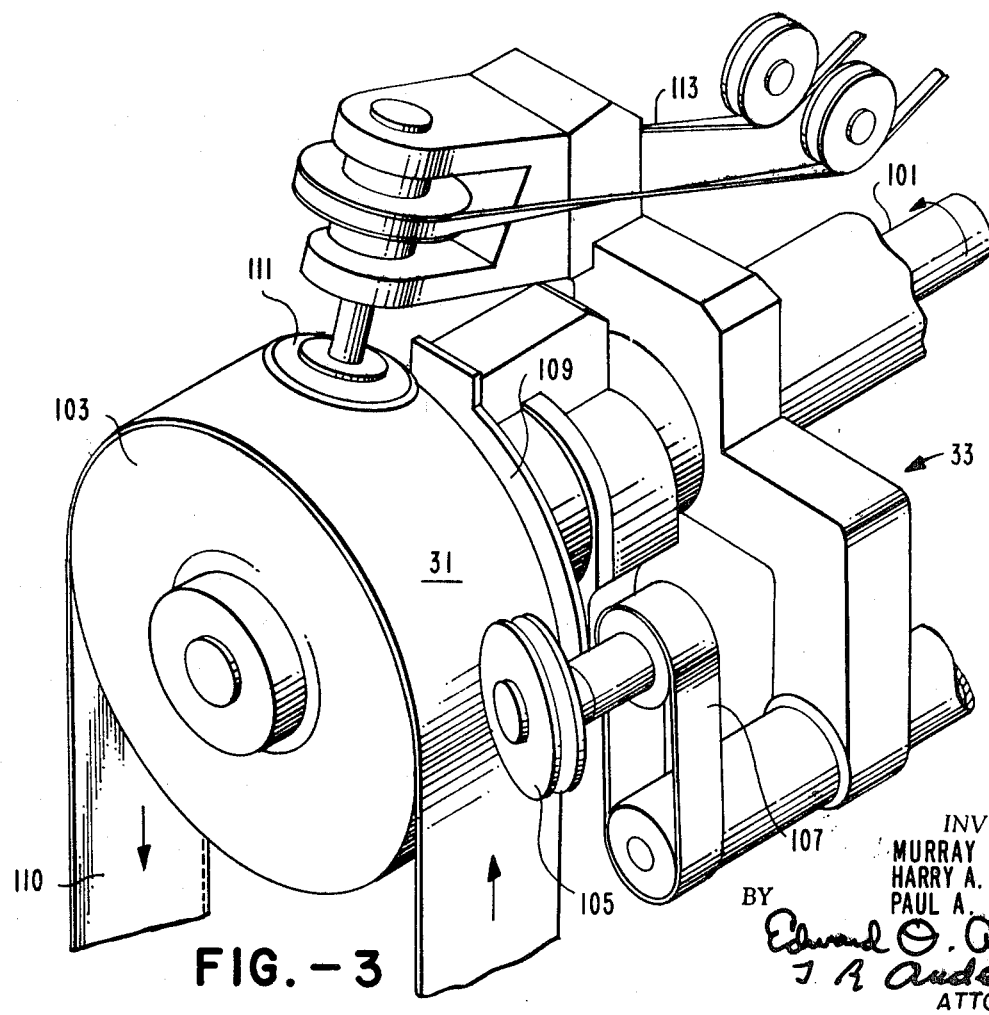
FIG. 3 is a perspective view of the device utilized to scarf the edges of the paper used to form the inner wall of the tube.

Referring now to FIG. 3, there is shown one of the devices utilized to scarf the edges of the paper that forms the inner tube of the device on which the membrane is coated. In this view as well as the other pictorial view of FIG. 1, only one such device is shown. However, it should be appreciated and, as will be explained, two devices are needed to scarf the opposite edges of the paper roll 31 so that they will form a mating seam. The scarfing of the paper is necessary in order to provide a wide-bond edge for the application of glue to adhere the paper together in a nonlapped seam. The motor drive is not seen in this view. However, the motor first drives a shaft 101 which in turn rotates wheel 103 over which the paper 31 passes. A skewed drive wheel 105 driven through a belt drive 107 forcing the paper 31 against a flat guide 109 so that the paper is perfectly aligned when it comes to a skewed scarfing knife 111. The scarfing knife 111 is a rotary wheel driven through belt drive 113, cutting the edge of the paper 31 at an angle determined by its skewed position. The additional scarfing knife, not seen, will cut the opposite edge of the paper 31 from its bottom surface 110 so as to form a matching joint, as can be readily appreciated. This is readily accomplished by doubling the paper back over a second rotating wheel so that the bottom surface 110 then becomes the exposed portion of the roll.

FIGS. 4A-4D disclose the various patterns for forming the support portions of the tubular structures of this invention to which the membrane solution is applied. It should be kept in mind that it is important to this invention that the membrane be applied over a smooth surface so that it will be properly supported to avoid damage upon pressurization. For this reason, the specific embodiment illustrated in the discussion has revolved around utilization of a paper inner tube. The paper inner tube can be unfilled cellulosic paper or partially resin-filled paper. It can additionally, of course, be made from a synthetic fiber with or without a nonwater-soluble binder, such as an acrylic resin. Additionally, the paper could be further strengthened with stiffening resins, though this is not necessary. The paper used will have a thickness that will vary from 0.002 to 0.015 inch. The permeability should be generally within the range of $1\times10^{15}$ darcy to $1\times10^{14}$ darcy at 750-p.s.i. operating pressure.

It is possible, however, to eliminate the paper by utilizing a plurality of longitudinal strands of fibers which have virtually no resin or very little resin content. The longitudinal fibers will serve both as a support for the membrane coating and as a structural member. Thus, as seen in FIG. 4A, a combination of the longitudinal strands 115 and hoop braid 117 surrounding the longitudinal strands provide an adequate structure eliminating the use of an inner paper tube. As can be appreciated when the inner tube is paper, the formed structure cannot readily be formed into spiral-membrane-containing elements.

FIG. 4B shows a hoop braiding 119 alone. In this instance the braiding would be applied over an inner paper tube. FIG. 4C once again discloses the use of longitudinal fibers 121 wound with a simple circumferential-wouund configuration 123. This differs from that shown in FIG. 4A in that the outer hoop fibers are not braided. FIG. 4D shows longitudinal fibers 124 and hoop braidings 126 applied over a paper tube. In all of the embodiments shown in FIGS. 4A-4D, the formed tubes are stationary relative to the mandrel and are merely pulled along it by the roller mechanisms previously described.

FIG. 4E shows the utilization of tapes 125 of fiber material preimpregnated with resin. Once again, these tapes would be wound over an inner paper core or longitudinal fiber.

Turning now to FIG. 5 there is seen a method where the formed tube will be rotated on the stationary mandrel 29. As shown, initially a roll of paper 127 is directed onto mandrel, followed by opposed tapes of resin-preimpregnated fibers 129 and 131. A belt drive 133 is wrapped about the paper and tapes downstream therefrom, rotating and tightly adhering successive layers to each other. The tapes 129 and 131 as well as the paper 127 are automatically pulled onto the stationary mandrel and forced along in a forward direction according to the downward directed arrow due to the angle of the belt 133 relative to the mandrel 29.

FIG. 5A shows a cross section of the formed underlying structure made according to FIG. 5 to which the membrane is applied, having an inner paper liner 135 to which the membrane solution is applied and two Fiberglass layers 137 and 139. It is noted that the Fiberglass layers are in parallel directions in accord with the technique of applying tapes as shown in FIG. 5, even though the two tapes therein 129 and 131 are applied from different sides of the mandrel.

The foregoing discussion has disclosed a limited number of possible configurations for forming the underlying structure to which the membrane is applied. Various other combinations and permutations of the basic concept are obviously contemplated. For example, an additional structure could be comprised of four layers of Fiberglass rovings on top of the underlying paper tube. The first layer would be longitudinal fibers, immediately placed adjacent to the paper tube. The next layer would be overbraided with a cross-braiding pattern, which would have a shallow wind angle of, for example, 15°. This overbraided layer would then be covered with a second layer of longitudinal fibers. Finally, an outer layer would again be cross-braided similar to the previous cross-braided layer of the structure but at a slightly greater angle, of, for example, 20°. Each layer will have a thickness of about 0.005 inch with the total Fiberglass tubular portion having a thickness of about 0.020 inch. In most all applications, the fibers will be comprised of glass impregnated with resin material such as thermoplastic resins including phenoxy and styrene-acrylonitrile. Thermosetting resins are also possible. Examples of suitable thermosetting resins include: phenolic, epoxy and polyesters. Glass fibers will generally have a diameter of 0.00025 to 0.00050 inches, inclusive. The ratio of resin to glass should be on the order of about 16 to 25 percent, depending primarily upon the glass weave. This furnishes just enough resin to hold the glass together without filling the interstices between rovings so that the resulting structure will thus be sufficiently permeable to allow for the flow of the product water therethrough. The permeability of the Fiberglass structure about the paper should be larger than that of the paper. Thus, as can be seen, the permeability will progressively increase away from the membrane with the Fiberglass structure having the greatest permeability, the paper having an intermediate permeability, and the membrane having a small and selective permeability allowing only for purified water and the like to pass through.

Turning now to FIG. 6 there is seen a depiction of one arrangement which is peculiarly adapted to using the type of tubes that can be produced in accord with the method of this invention. As shown in the figure, a pumping unit 141 pumps the brackish solution entering it in line 143 to an inlet pipe 145 which is in turn connected to a plurality of units 146 of hoops 148. Each hoop 148 is comprised of a separate spiral of tubular pipe formed in accord with this invention. For example, one can form a seven-loop spiral going from the inlet pipe 145 and ending in an outlet pipe 147. Obviously, the number of spirals between the inlet and outlet pipes will be determined by the overall size of the desired device, the rate of input, and the like. A device such as shown, for example, could have an overall outer diameter of 5 feet, wherein the individual tubes would have inside diameters of 0.25 inches. As can be appreciated, the foregoing system provides for considerable surface area of membrane being exposed to the inlet stream within a compact space. Not shown in FIG. 6 would be a collector located at the bottom of the coils for collecting the clean water emitted from the loops as the material is circulated.

FIG. 7 depicts another embodiment of an end connector for the tubes formed in accord with this invention wherein the tubes are used in straight predetermined lengths connected between pressure heads. As shown, a generally hemispherical-shaped pressure head 149 has an inlet 151 through which the incoming brackish water is directed. Seated within the pressure head 149 is a flow directional element 153, having a plurality of flow directional apertures 155 disposed therein. Additionally seated and secured to the pressure head 149 by a snapring 156 is end fitting 157 which contains the tubes 159 made in accord with this invention. The tubes are grouped together in a plurality of segments 161, 165, 167, 169 (and 163, not shown in the figure). As shown by the arrow path, the incoming fluid, for example, is directed to a first segment 161 having a plurality of tubes 159. In the embodiment of this figure there are five segments containing the tubes. Thus, the entering stream will pass through one segment 161 in its downward or initial direction and travel the length of the tubes to another similar endpiece wherein the fluid is turned around and directed back up through one more segment 163, not shown in this view. In turn the fluid is then redirected down segment 165, up 167, down 169, and emitted from the other end of the device with the clean water being collected from the outer surfaces of the tubes 159 between the two endpieces.

While several embodiments of the invention have been illustrated and described, it will be understood that the invention should not be construed as being limited thereto, but only to the lawful scope of the appended claims.

We claim:

1. A tubular reverse osmosis element comprising a porous, elongated, resin-bonded glass fiber tube having an adhering paper layer at its inner surface with a reverse osmosis membrane formed on and adhering to the inner face of the paper layer, said resin serving to bond the fibers of the tube together and the paper layer to the glass fibers.

2. A tubular reverse osmosis element in accordance with claim 1 wherein the glass fiber portion of the tubular element is more permeable than the paper.

3. A method for continuously forming a reverse osmosis tube comprising the following steps in the order presented:
   wrapping a porous, fibrous strip about a mandrel,
   sealing the porous, fibrous strip at its edges to form a porous, fibrous tube,
   moving the porous, fibrous tube along the mandrel,
   winding resin-impregnated glass fibers over the outer surface of the moving tube to produce a porous glass fiber coating,
   heating the glass fiber coating as it moves with the tube to cure the resin,
   cooling the glass fiber coating,
   coating the inner surface of the moving porous, fibrous tube with a thin layer of reverse-osmosis-membrane-forming solution,
   drawing a slight vacuum around the outer surface of the porous glass fiber coating in an area overlapping the axial position where the membrane-forming solution is applied, causing the membrane-forming solution to closely adhere to the inner surface of the porous, fibrous tube, and
   immersing the coated porous, fibrous tube in a gelatin bath to gel the film to a useable membrane state.